United States Patent
Mao et al.

(10) Patent No.: US 12,135,588 B2
(45) Date of Patent: Nov. 5, 2024

(54) INGRESS PROTECTION SUBSYSTEM FOR MICROPHONES IN MOBILE COMPUTING DEVICES

(71) Applicant: ZEBRA TECHNOLOGIES CORPORATION, Lincolnshire, IL (US)

(72) Inventors: Yanmin Mao, Brampton (CA); Michele B. Feinstein, Oceanside, NY (US); Mark X. Lamont, Coram, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 337 days.

(21) Appl. No.: 17/357,541

(22) Filed: Jun. 24, 2021

(65) Prior Publication Data

US 2022/0413565 A1 Dec. 29, 2022

(51) Int. Cl.
*G06F 1/16* (2006.01)
*H04M 1/02* (2006.01)
*H04R 1/08* (2006.01)

(52) U.S. Cl.
CPC .......... *G06F 1/1656* (2013.01); *G06F 1/1626* (2013.01); *G06F 1/1684* (2013.01); *H04M 1/026* (2013.01); *H04R 1/08* (2013.01); *H04R 2499/11* (2013.01)

(58) Field of Classification Search
CPC .... G06F 1/1656; G06F 1/1626; G06F 1/1684; H04M 1/026; H04M 1/18; H04M 1/035; H04R 1/08; H04R 2499/11; H04R 1/086; H04R 1/083; H04R 1/12; H04R 2201/02
See application file for complete search history.

(56) References Cited

U.S. PATENT DOCUMENTS

| 10,031,086 B2 | 7/2018 | Prusik et al. | |
| 2015/0304750 A1* | 10/2015 | Mori | H04R 1/023 |
| | | | 381/334 |
| 2017/0308123 A1* | 10/2017 | McClure | H01Q 1/42 |

(Continued)

FOREIGN PATENT DOCUMENTS

| EP | 1049930 B1 | 2/2007 |
| EP | 2343872 B1 | 1/2016 |

OTHER PUBLICATIONS

International Search Report and Written Opinion for International Application No. PCT/US2022/25283 mailed on Aug. 1, 2022.

(Continued)

*Primary Examiner* — Anthony Q Edwards
*Assistant Examiner* — Hung Q Dang

(57) ABSTRACT

A mobile computing device includes: a housing having a front face, an opposing back face, and side walls joining the front and back faces; a microphone supported within the housing; and an acoustic channel extending between the microphone and an exterior of the housing, the acoustic channel defined by: (i) a microphone port traversing one of the side walls; (ii) a membrane assembly affixed to a first inner housing surface around the microphone port; and (iii) an isolation plate affixed to a second inner housing surface surrounding at least a portion of the first inner housing surface, the isolation plate having a channel opening therethrough and configured to engage with the membrane assembly.

20 Claims, 8 Drawing Sheets

(56) References Cited

U.S. PATENT DOCUMENTS

2018/0100807 A1     4/2018  Abdo et al.
2019/0377388 A1*  12/2019  McClure .............. G06F 1/1643
2020/0280781 A1     9/2020  Holliday

OTHER PUBLICATIONS

Novelty Search Report for Belgian Application No. 2022/5497 mailed on Jun. 23, 2022.
Novelty Search Report for Belgian Patent Application No. 2022/5497 mailed on Mar. 8, 2023.

* cited by examiner

INGRESS PROTECTION SUBSYSTEM FOR MICROPHONES IN MOBILE COMPUTING DEVICES

BACKGROUND

Mobile computing devices may be deployed in a wide variety of environments, including those containing environmental factors such as moisture, dust and the like. Entry of such environmental factors into the housing of a computing device may damage the computing device, and mobile computing devices may therefore be deployed with ingress protection features. Ingress protection features may include device housings that are sealed against entry of dust, moisture and the like. However, certain components of the devices, such as microphones, may require exposure of an interior of the device to the external environment of the device. Features such as membranes may allow such exposure while maintaining a degree of ingress protection, but may also be easily disrupted during assembly of the device, which can reduce microphone performance, ingress protection performance, or both.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
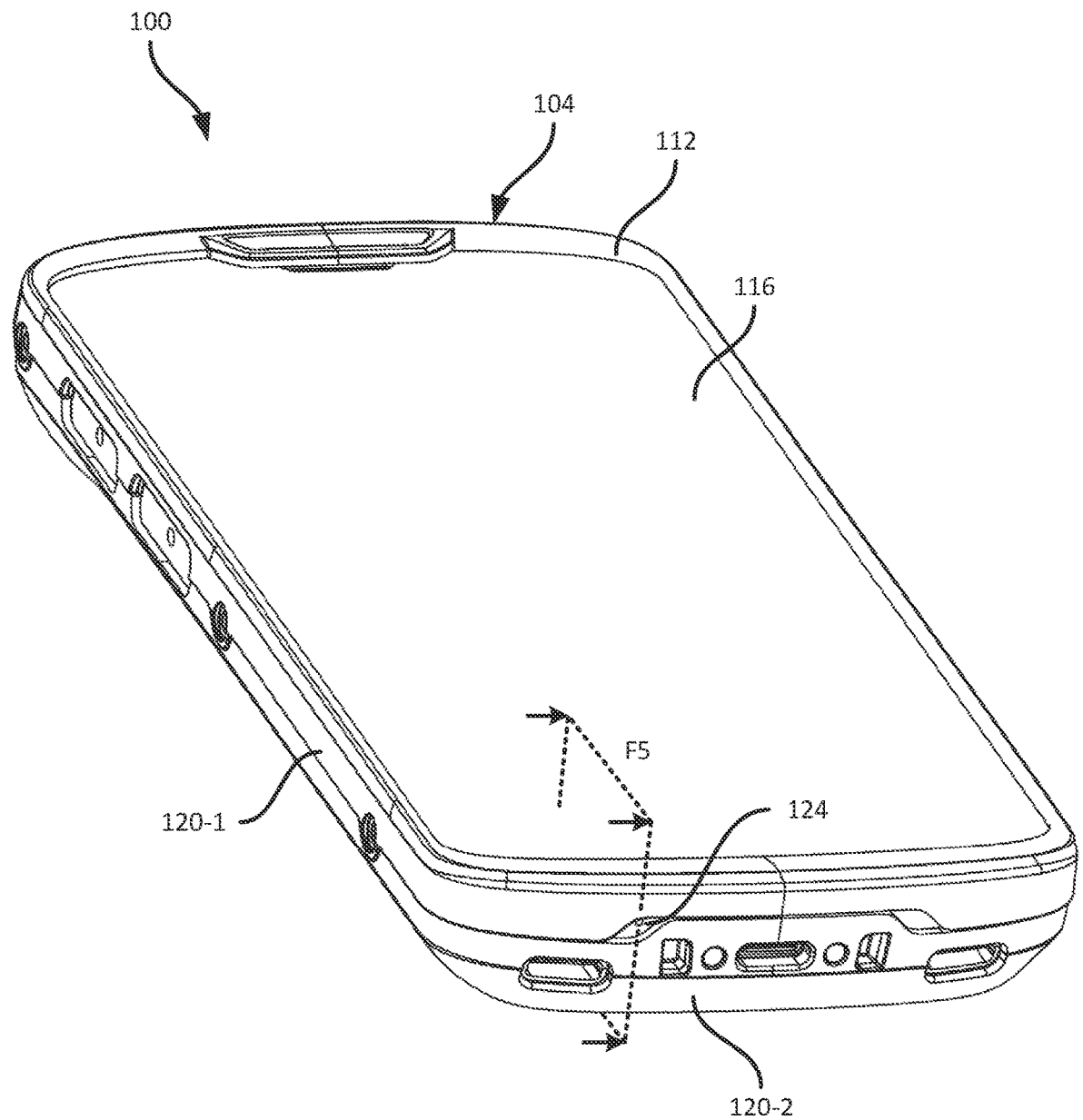
FIG. 1 is a diagram of a mobile computing device viewed from the front.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile computing device including: a housing having a front face, an opposing back face, and side walls joining the front and back faces; a microphone supported within the housing; and an acoustic channel extending between the microphone and an exterior of the housing, the acoustic channel defined by: (i) a microphone port traversing one of the side walls; (ii) a membrane assembly affixed to a first inner housing surface around the microphone port; and (iii) an isolation plate affixed to a second inner housing surface surrounding at least a portion of the first inner housing surface, the isolation plate having a channel opening therethrough and configured to engage with the membrane assembly.

Additional examples disclosed herein are directed to a microphone assembly for a mobile computing device, the microphone assembly including: a microphone supported within a device housing; a membrane assembly affixed to a first inner housing surface around a microphone port of the device housing; and an isolation plate affixed to a second inner housing surface surrounding at least a portion of the first inner housing surface, the isolation plate having a channel opening therethrough and configured to engage with the membrane assembly.

FIG. 1 shows a mobile computing device 100, such as a smart phone or other mobile computer. The device 100 includes a housing 104 supporting various other components of the device 100. The housing 104 includes a front face, defined in this example by a bezel 112 and a display 116 supported by the housing 104. The housing 104 also includes a plurality of side walls 120, of which two side walls 120-1 and 120-2 are visible in FIG. 1. In this example, the side wall 120-2 may also be referred to as a bottom wall.

The components of the device 100 supported within the housing 104 include at least one microphone. The device 100 can include a plurality of such microphones, although a single microphone is discussed below for illustrative purposes. While the microphone itself is disposed within the housing 104, operation of the microphone involves exposing the microphone to pressure changes in the external environment of the device 100. To that end, the housing 104 includes a microphone port 124 defined in one of the side walls 120. In the illustrated example, the port 124 is defined through the bottom wall 120-2 of the housing 104.

Because the port 124 traverses the housing 104, the device 100 also includes ingress protection components, discussed below in greater detail, to enable functioning of the microphone while reducing or eliminating entry of environmental contaminants (e.g. dust and water) into the housing 104. As will be apparent in the discussion below, the ingress protection components are structured so as to reduce or eliminate deformation or other disruption of the ingress protection components during assembly of the device 100, which could otherwise reduce ingress protection performance and/or acoustic performance of the microphone.

Figure 2:
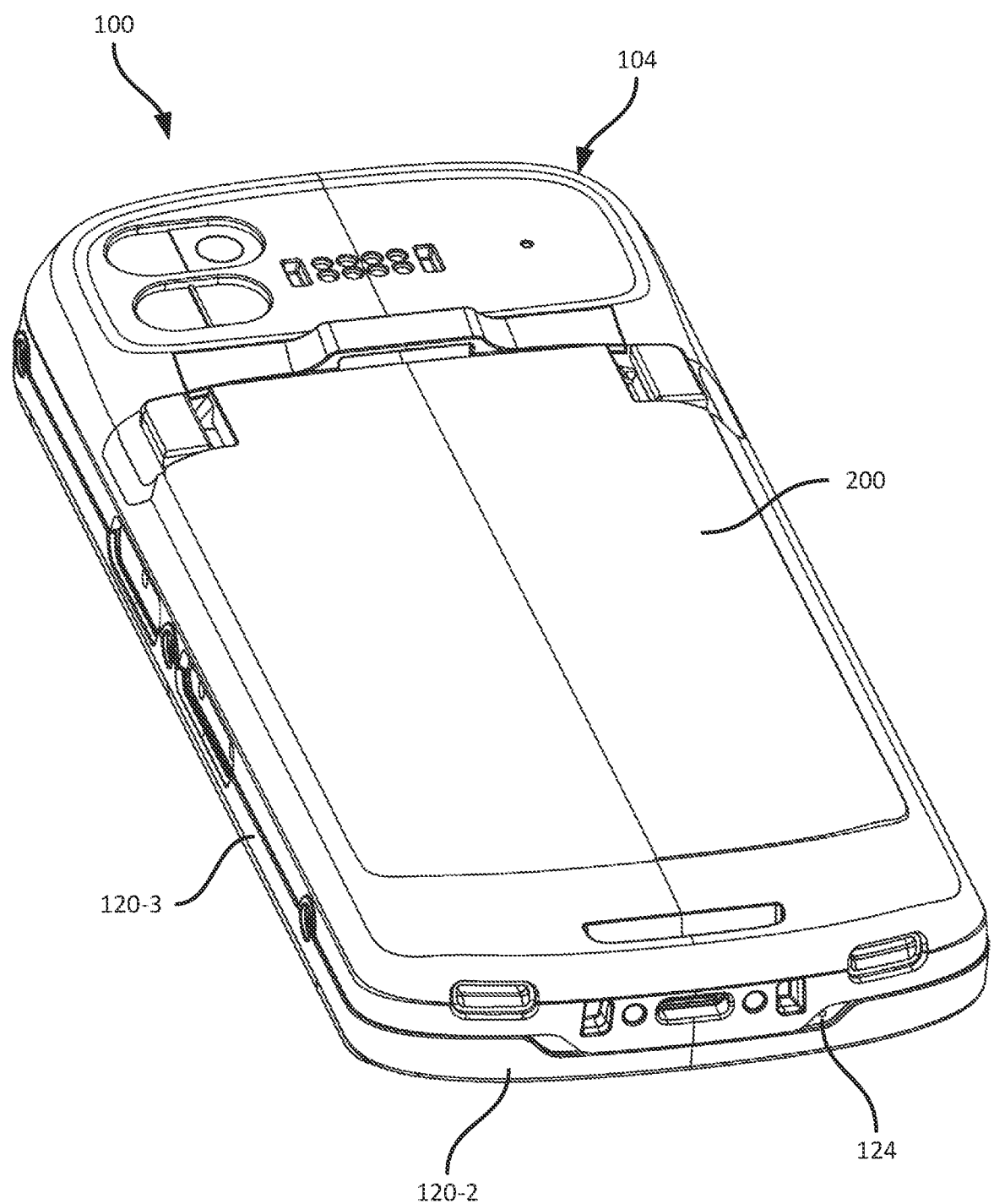
FIG. 2. is a diagram of a mobile computing device viewed from the back.

FIG. 2 illustrates a back view of the device 100, in which a back face 200 is visible, opposite the front face defined by the bezel 112 and display 116. The microphone port 124 is also shown on the bottom wall 120-2, and a further side wall 120-3 (opposite the side wall 120-1 shown in FIG. 1) is illustrated. As will be apparent, the side walls 120 join the back face 200 with the front face of the device 100, to form an enclosed space within the housing 104.

Figure 3:
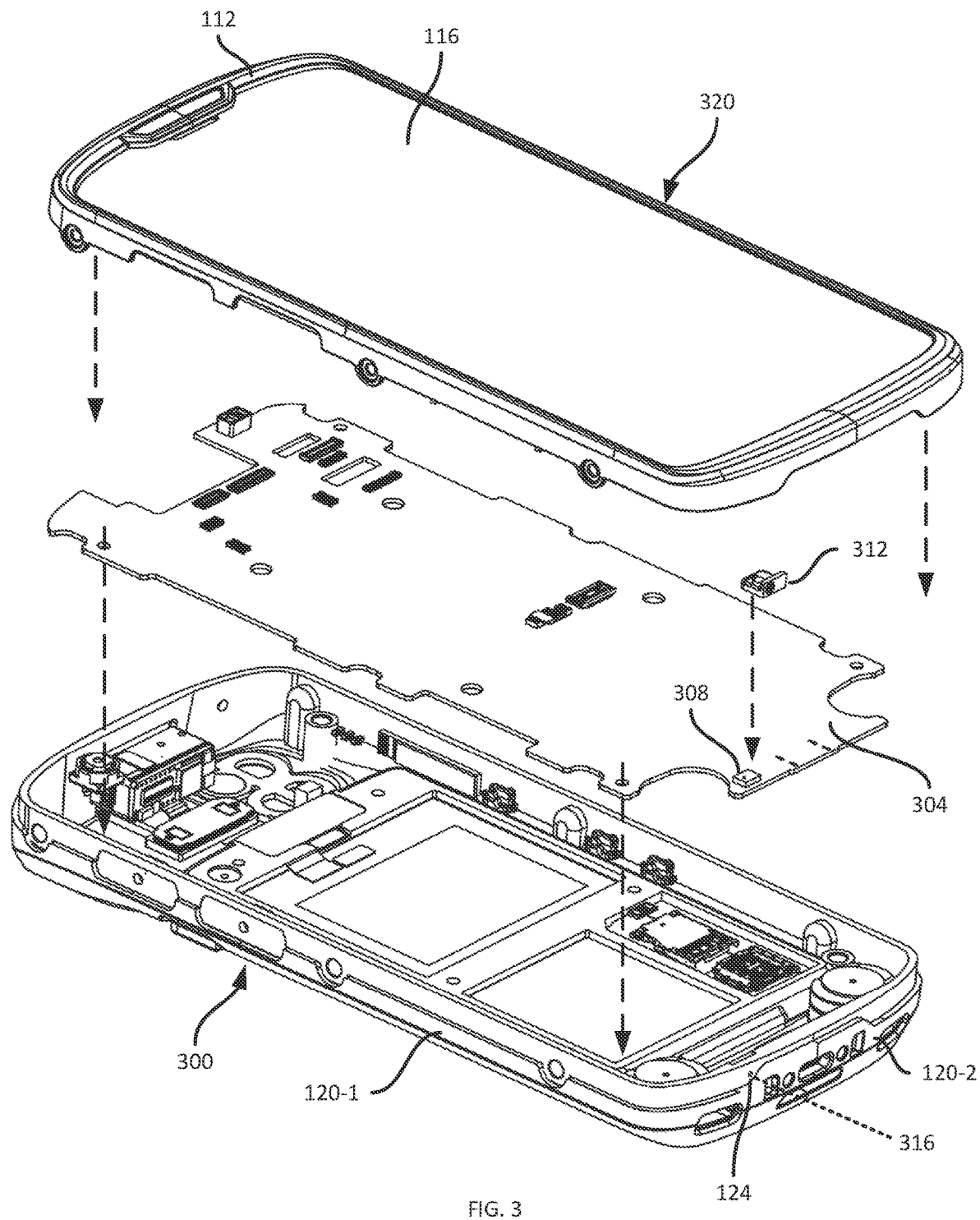
FIG. 3 is an exploded view of the mobile computing device of FIG. 1.

FIG. 3 illustrates an exploded view of the device 100, e.g. when the device 100 is partially assembled. In particular, a lower assembly 300 is illustrated, including a lower portion of the housing defining the side walls 120 and the microphone port 124, and containing various other internal components of the device 100. In addition, a support 304 is illustrated, carrying certain electrical components of the device 100, including a microphone 308. The support 304 is a printed circuit board (PCB) in this example. In other examples, the microphone 308 can be mounted on an auxiliary support separate from the PCB and connected to the PCB via a flex cable or other suitable connector. The auxiliary support can include an internal housing component, a secondary PCB, or the like.

The support 304 also carries a microphone cover 312, which substantially encloses the microphone 308 on the support 304 and defines a portion of an acoustic channel extending from the microphone 308 to the exterior of the device 100 via the port 124. The acoustic channel is substantially cylindrical in this example, and has a central axis (which may also be referred to as a longitudinal axis) 316. The central axis, as seen in FIG. 3, is substantially parallel to the front face of the device 100, defined by the bezel 112 and display 116. The support 304 is also substantially parallel to the front face of the device 100, and therefore to the axis 316.

Completing the assembly of the device 100 includes placing the cover 312 onto the microphone 308, e.g. by affixing the cover 312 to the support 304 via an adhesive, and then inserting the support 304 into the lower assembly 300, which may include a frame or the like within the lower housing portion to mount the support 304. Following insertion of the support 304, an upper assembly 320 including the bezel 112 and display 116 can be placed onto the lower assembly 300 and affixed to the lower assembly 300 via fasteners such as screws, snap-fit features on the housing 104, or the like.

As will be apparent from FIG. 3, the direction in which the support 304 is inserted into the lower assembly 300, as well as the direction in which the upper assembly 320 is placed onto the lower assembly 300 (indicated by the dashed arrows) is perpendicular to the axis 316 of the acoustic channel. As a result, certain ingress protection components, discussed below in connection with FIG. 4, may be deformed and/or displaced relative to the housing 104 during assembly of the device 100 by shear forces applied to such components by the support 304 and/or the cover 312.

Figure 4:
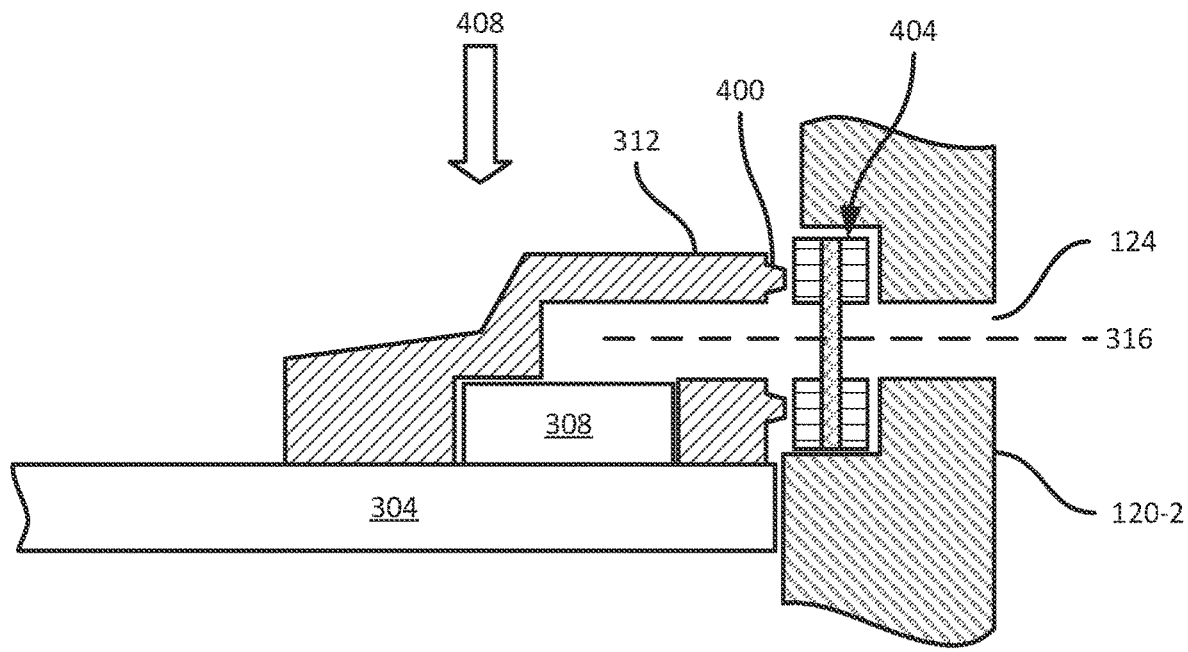
FIG. 4 is a partial cross section of a mobile computing device.

Turning to FIG. 4, a simplified cross section of a portion of the support 304, as well as the microphone 308 and the cover 312, are illustrated. As seen in FIG. 4, the cover 312 can include a resilient seal 400 extending outwards (i.e. towards the exterior of the device 100) therefrom, to contact a membrane assembly 404. When the support 304 and cover 312 are installed into the lower assembly 300 in the direction 408, the seal 400 may apply a shear force to the membrane assembly 404. The membrane assembly 404, as will be described in greater detail below, includes a membrane that traverses the acoustic channel extending between the microphone 308 and the exterior of the device 100 via the port 124. The membrane reduces or eliminates the entry of contaminants such as dust or water into the housing 104, but is sufficiently flexible to transmit sound along the acoustic channel.

That shear force mentioned above can lead to deformation and/or displacement of the membrane assembly (e.g. wrinkling or warping of the membrane), which can result in obstruction of the acoustic channel and/or reduce ingress protection being provided by the membrane assembly 404. Obstruction or deformation of the acoustic channel, in turn, can affect acoustic performance of the microphone 308. For example, a warped membrane can change the shape of the acoustic channel, and/or introduce gaps in the channel allowing sound to escape the acoustic channel. Consistency of acoustic performance between devices may also be negatively affected, as the degree and nature of deformation to the membrane may not be consistent between defines. Such deformations may be difficult to tune for, because of the variability inherent to deformations or other imperfections in the membrane introduced by the shear forces mentioned above. The device 100 therefore includes additional structural features to isolate the membrane assembly 404 from such shear forces. Those structural features, discussed below in greater detail, are omitted from FIG. 4 for illustrative purposes.

Figure 5:
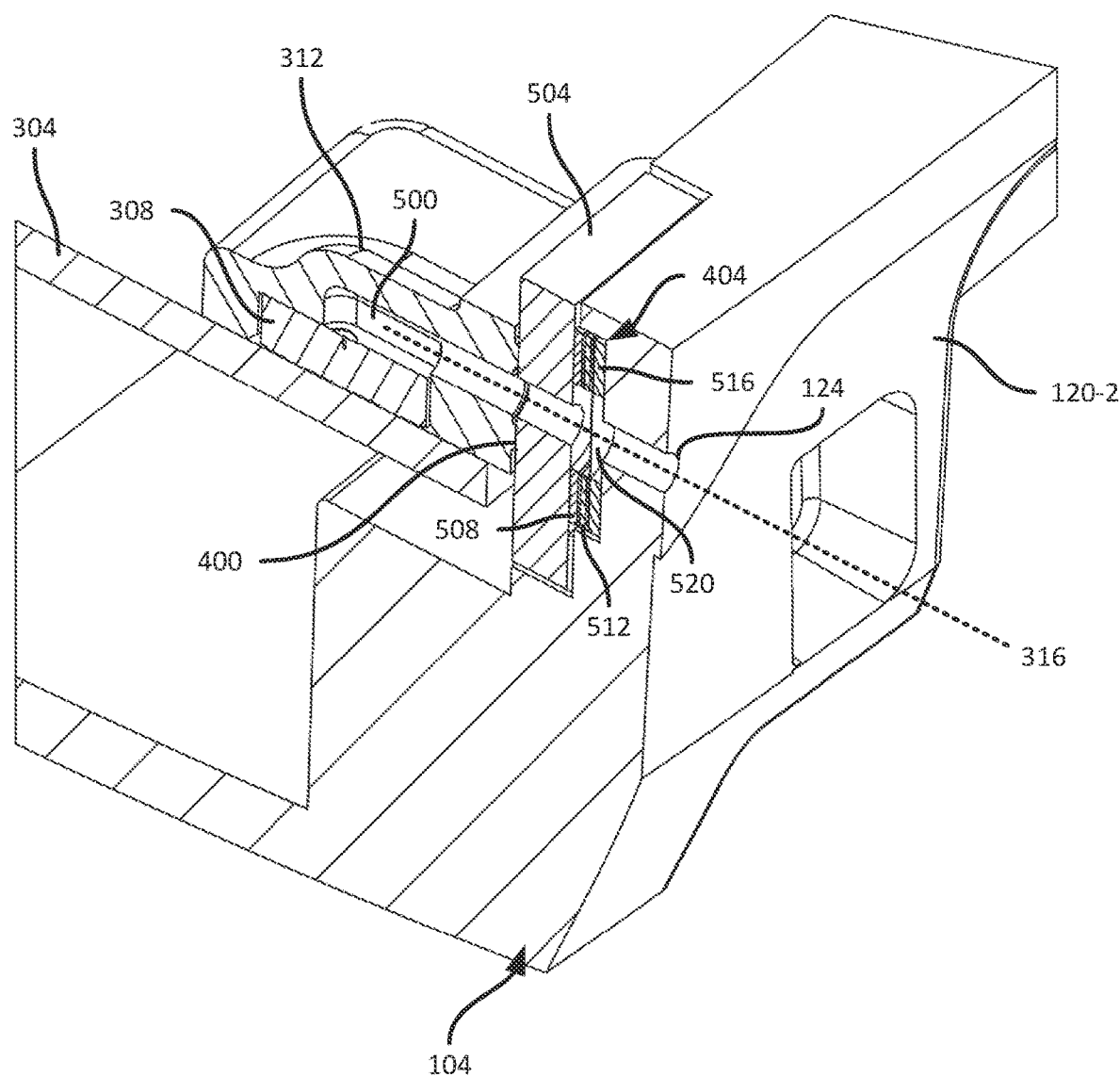
FIG. 5 is a partial cross section of the mobile computing device of FIG. 1, taken at the plane F5 indicated in FIG. 1.

Turning to FIG. 5, the above-mentioned structural features are illustrated in a partial cross section of the device 100, taken at the plane "F5" indicated in FIG. 1. When the device 100 is assembled, an acoustic channel with the central axis 316 is formed by a set of interacting components, extending from the microphone 308 to the exterior end of the microphone port 124. In particular, beginning at the microphone 308, a first portion of the acoustic channel is defined by the microphone cover 312, which includes an internal chamber 500 containing the microphone 308. The chamber 500 extends from the microphone 308 to an outlet of the cover 312, which is surrounded by the seal 400 mentioned above in connection with FIG. 4.

The seal 400 of the cover 312 is configured to engage with an isolation plate 504 disposed between the cover 312 and the membrane assembly 404. The isolation plate 504 includes a channel opening therethrough defining a portion of the acoustic channel, and is affixed to an inner surface of the housing 104, rather than to the membrane assembly 404. That is, the isolation plate 504 is not necessarily affixed to the membrane assembly 404, although the isolation plate 504 does contact the membrane assembly 404. The isolation plate 504 is therefore larger than the membrane assembly 404, such that the isolation plate 504 contacts a portion of the housing 104 surrounding the membrane assembly 404. The isolation plate 504 is additionally sufficiently rigid to isolate the membrane assembly 404 from shear forces applied by the seal 400 during installation of the support 304.

The isolation plate 504 can be provided with the above-mentioned rigidity by either or both of the material(s) used to fabricate the isolation plate 504, and the geometry of the isolation plate 504. In the illustrated example, the isolation plate 504 has a thickness (measured in a direction parallel to the axis 316) exceeding that of the membrane assembly 404. The isolation plate 504 can be fabricated from a rigid plastic, a composite material such as a fiberglass and epoxy composite (e.g. FR4), a metal, or the like. The rigidity of the isolation plate 504, coupled with the mounting of the isolation plate 504 directly to the housing 104 rather than to the membrane assembly 404, enables the isolation plate 504 to resist shear forces to a degree sufficient to reduce or eliminate deformation/distortion or displacement of the membrane assembly 404 as a result of such shear forces. That is, although the isolation plate 504 is subject to the shear forces mentioned earlier, the isolation plate 504 does not warp under such forces and therefore prevents shear forces from being imparted to the membrane assembly 404. Further, the isolation plate 504 is installed onto the membrane assembly in a direction parallel to the axis 316, and thus imparts little or no shear force to the membrane assembly during installation.

The membrane assembly 404 itself includes a set of components, stacked together and coupled via adhesives or other suitable bonding agents. In particular, the membrane assembly 404 includes an annular interface member 508, e.g. fabricated from closed-cell acoustic foam, configured to engage with an outer side of the isolation plate 504 (i.e. the side opposite that engaged with the seal 400). The interface member 508 is not adhered to the isolation plate 504 in this example, permitting movement of the membrane assembly relative to the isolation plate 504 during assembly of the device 100 and reducing the impact of manufacturing tolerance deviations in the isolation plate 504 or components of the membrane assembly 404. In other examples, the interface member 508 can be adhered or otherwise assembled to the isolation plate 504.

The membrane assembly 404 further includes an inner annular frame 512, an adhesive layer 516 to affix the membrane assembly 404 to the housing 104, and a membrane 520 mounted between the frame 512 and the adhesive 516. While the interface 508, the frame 512, and the adhesive 516 are annular, having openings therethrough that define portions of the acoustic channel, the membrane 520 traverses the acoustic channel, preventing or at least reducing the ingress of contaminants such as water and dust into the housing 104 via the port 124. The inner frame 512 can be affixed to the interface 508 and to the membrane 520 via suitable adhesives (not shown).

Figure 6:
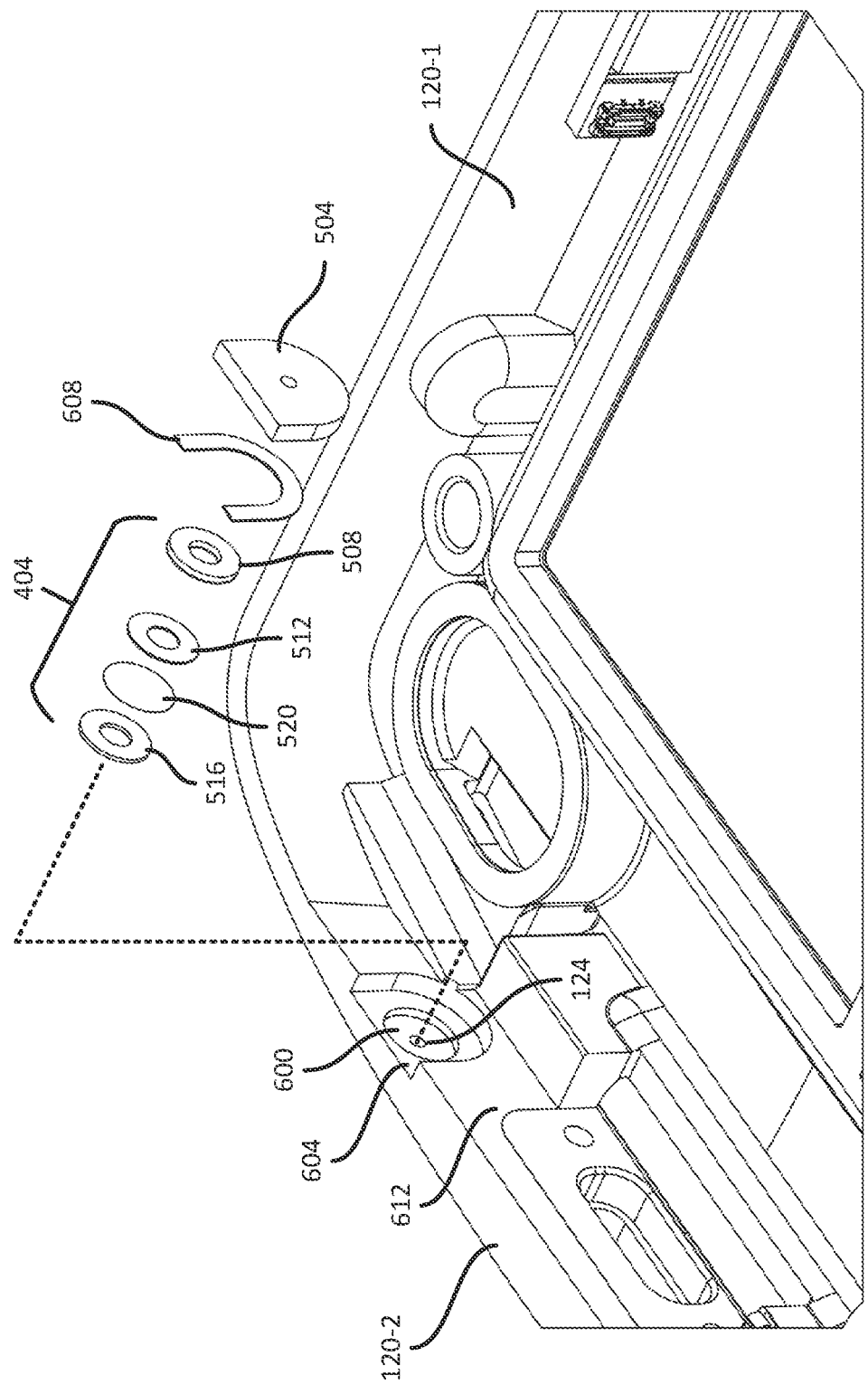
FIG. 6 is a partial exploded view of the mobile computing device of FIG. 1.

FIG. 6 illustrates an exploded view of the membrane assembly 404 and isolation plate 504 from inside the housing 104, omitting the support 304, microphone 308 and cover 312. As seen in FIG. 6, the components of the membrane assembly 404 (the adhesive 516, membrane 520, inner frame 512, and interface 508) are assembled (e.g. via suitable adhesives, not shown) and affixed to a first inner housing surface 600 that surrounds the port 124. The first inner surface 600 can be defined within an indentation into the wall 120-2.

Following the installation of the membrane assembly 404, the isolation plate 504 is installed by affixing the isolation plate 504 to a second inner housing surface 604. The isolation plate can be affixed to the second inner surface 604 via an adhesive layer 608. The second inner surface 604, as illustrated, is defined in an intermediate indentation, at a greater depth than a primary inner surface 612 of the wall 120-2, but a smaller depth than the first inner surface 600. The second inner surface 604 surrounds the first inner surface 600.

Figure 7:
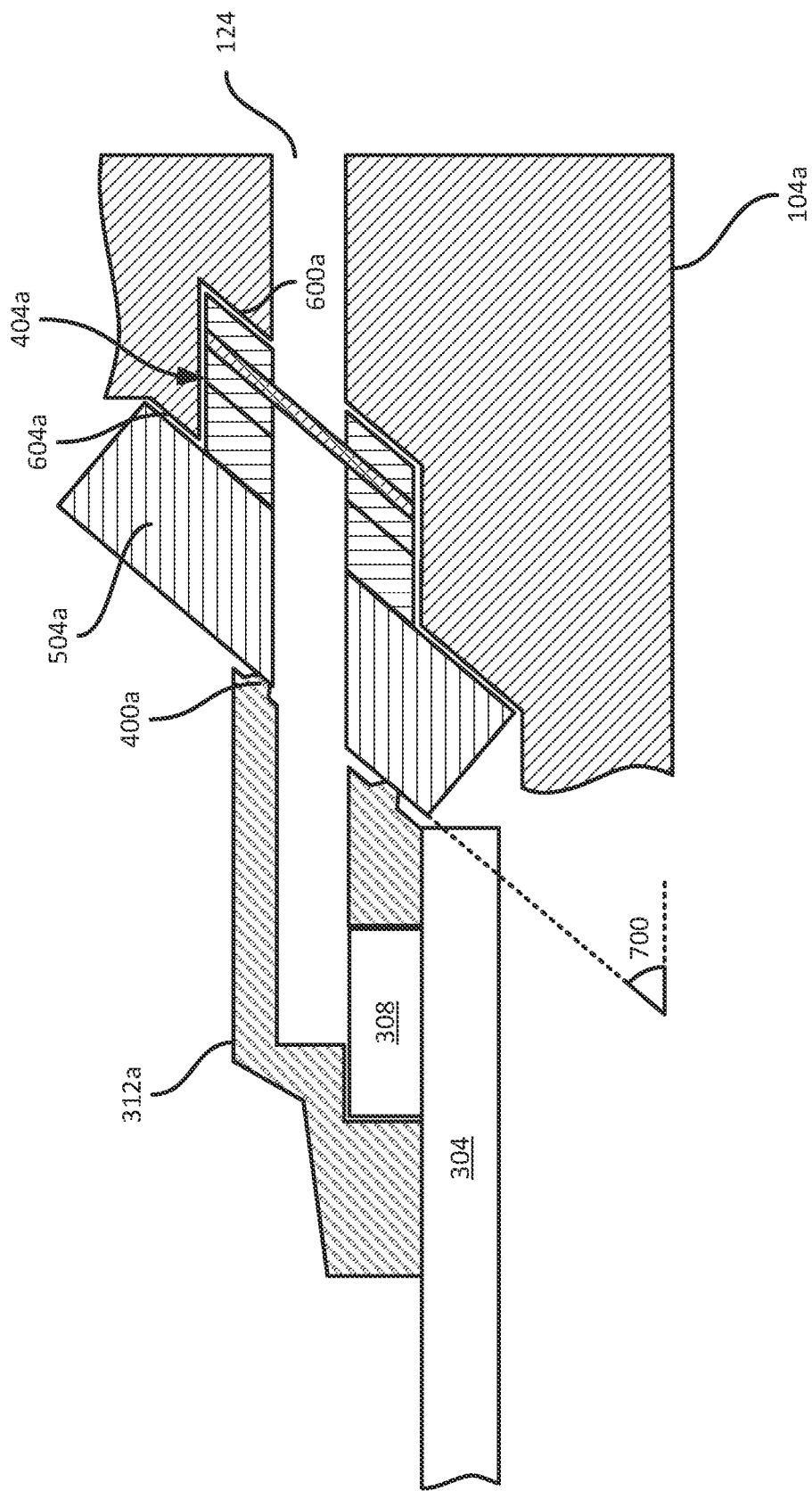
FIG. 7 is partial cross section of another example mobile computing device.

Turning to FIG. 7, another implementation is shown, in which certain components of the device 100 have surfaces at non-right angles relative to the plane formed by the front face of the device 100 (e.g. the display 116). As will be apparent from FIGS. 4-6, the outer surface of the microphone cover 312 (that is, the surface carrying the seal 400), as well as the inner and outer surfaces of the isolation plate 504 and the membrane assembly 404 are substantially perpendicular to the plane of the support 304 and the plane of the front face of the device 100. In some examples, the above-mentioned surfaces can be inclined at between about 85 and 90 degrees relative to the support 304 and/or the display 116.

As shown in FIG. 7, in other examples the above-mentioned surfaces can be angled at non-right angles, such as the angle 700, which is about 40 degrees in the illustrated exampled. More generally, the angle 700 can be greater than zero degrees, and smaller than 90 degrees. In some examples, the angle 700 can be between about 20 degrees and about 80 degrees. The angled inner and/or outer surfaces of the cover 312*a* (from which the seal 400*a* extends), isolation plate 504*a*, and membrane assembly 404*a*, facilitate installation of the support 304 and the cover 312*a* by reducing the shear force that must be overcome to slide the seal 400*a* along the isolation plate 504*a* until the cover 312 and support 304 are in the installed position. Reducing the above-mentioned shear force may also reduce or eliminate deformation of the cover 312*a* during installation. As shown in FIG. 7, the inner surfaces 600*a* and 604*a* can also be inclined at the angle 700.

In further examples, the isolation plate 504 may be omitted from the implementation shown in FIG. 7, such that the cover 312*a* directly engages with the membrane assembly 404*a*. The angling of the outer surface of the cover 312 and membrane assembly 404*a* may reduce the previously mentioned shear forces sufficiently that deformation or displacement of the membrane assembly 404*a* may be avoided without use of the isolation plate 504*a*. However, use of the isolation plate 504*a* further mitigates deformation or displacement of the membrane assembly 404*a*.

Figure 8:
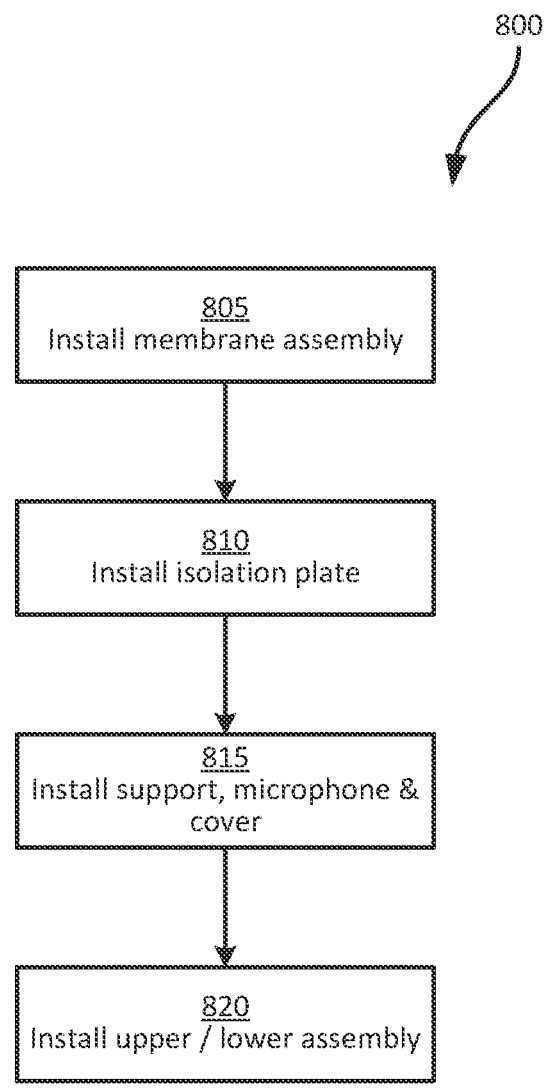
FIG. 8 is a flowchart of a method of assembling the mobile computing device of FIG. 1.

Turning to FIG. 8, a method 800 of assembling the device 100 is illustrated, e.g. from the stage shown in FIG. 3 (i.e. in which the upper and lower assemblies 300 and 320 have been assembled). At block 805, the membrane assembly 404 is installed. For example, the components of the membrane assembly 404 can be affixed to one another, and the membrane assembly (specifically the membrane 520, in this example) can be affixed to the first inner housing surface 600 by the adhesive 516.

At block 810, the isolation plate 504 is installed over the membrane assembly 404, by affixing the isolation plate 504 to the second inner housing surface 604 (e.g. via the adhesive 608). Following installation of the isolation plate 504, at block 815 the microphone 308, cover 312, and support 304 (having been previously assembled) are installed into the device 100, for example by inserting the support 304 into the lower assembly 300. Finally, at block 820, the lower assembly 300 and the upper assembly 320 are assembled to one another.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device, comprising:
   a housing having a front face, an opposing back face, and side walls joining the front and back faces;
   a microphone supported within the housing; and
   an acoustic channel extending between the microphone and an exterior of the housing, the acoustic channel defined by:
   (i) a microphone port traversing one of the side walls;
   (ii) a membrane assembly affixed to a first inner housing surface around the microphone port; and
   (iii) an isolation plate affixed to a second inner housing surface surrounding at least a portion of the first inner housing surface, the isolation plate having a channel opening therethrough and configured to engage with the membrane assembly, wherein the first inner housing surface and the second inner housing surface are integral to the housing.

2. The mobile computing device of claim 1, further comprising:
   a support within the housing;
   wherein the microphone is mounted on the support.

3. The mobile computing device of claim 2, wherein the support is mounted within the housing substantially parallel to the front face.

4. The mobile computing device of claim 3, wherein the acoustic channel has a central axis substantially parallel to the front face.

5. The mobile computing device of claim 4, further comprising:
   a microphone cover affixed to the support and defining an internal chamber containing the microphone, the microphone cover configured to engage with the isolation plate to place the internal chamber in communication with the channel opening.

6. The mobile computing device of claim 5, wherein the support and the microphone cover are configured for insertion into the housing in a direction perpendicular to the central axis.

7. The mobile computing device of claim 1, wherein the membrane assembly includes a membrane traversing the acoustic channel to provide environmental ingress protection.

8. The mobile computing device of claim 7, wherein the membrane assembly further includes:
   an annular inner frame;
   wherein the membrane is supported on the inner frame.

9. The mobile computing device of claim 8, wherein the membrane is affixed to the first inner housing surface.

10. The mobile computing device of claim 7, wherein the membrane assembly further includes an interface member configured to engage with the isolation plate.

11. The mobile computing device of claim 10, wherein the interface member comprises acoustic foam.

12. The mobile computing device of claim 1, wherein the microphone cover includes a resilient seal on an outer surface of the microphone cover, configured to engage with the isolation plate.

13. The mobile computing device of claim 12, wherein the outer surface is at a non-right angle relative to the front face.

14. The mobile computing device of claim 13, wherein the non-right angle is between about 20 degrees and about 80 degrees.

15. The mobile computing device of claim 1, wherein the isolation plate comprises at least one of a composite material, a metal, or a plastic.

16. The mobile computing device of claim 1, wherein the one of the side walls includes a primary inner surface; wherein the first inner housing surface is indented relative to the primary inner surface.

17. The mobile computing device of claim 16, wherein the second inner housing surface is indented relative to the primary inner surface.

18. The mobile computing device of claim 17, wherein the second inner housing surface is indented at a smaller depth than the first inner housing surface.

19. A microphone assembly for a mobile computing device, the microphone assembly comprising:
- a microphone supported within a device housing;
- a membrane assembly affixed to a first inner housing surface around a microphone port of the device housing; and
- an isolation plate affixed to a second inner housing surface surrounding at least a portion of the first inner housing surface, the isolation plate having a channel opening therethrough and configured to engage with the membrane assembly, wherein the first inner housing surface and the second inner housing surface are integral to the device housing.

20. The microphone assembly of claim 19, further comprising:
- a microphone cover affixed to the support and defining an internal chamber containing the microphone, the microphone cover configured to engage with the isolation plate to place the internal chamber in communication with the channel opening.

\* \* \* \* \*